United States Patent [19]
Andersen et al.

[11] 3,723,423
[45] Mar. 27, 1973

[54] NOVEL ALKOXYTETRAHYDROPYRANOL ETHERS OF PROSTAGLANDINS

[75] Inventors: Niels H. Andersen, Seattle, Wash.; Ned M. Weinshenker, Sunnyvale, Calif.

[73] Assignee: Alza Corporation, Palo Alto, Calif.

[22] Filed: Jan. 22, 1971

[21] Appl. No.: 108,989

[52] U.S. Cl. ............... 260/240 R, 99/2 M, 424/283, 260/247.2 B, 260/293.67, 260/345.7, 260/345.8, 260/345.9, 260/464, 260/468 D, 260/514 D
[51] Int. Cl. ........................ C07c 61/36, C07d 7/04
[58] Field of Search ........................... 260/240 R, 260/345.7 345.8, 468 D, 514 D

[56] References Cited

OTHER PUBLICATIONS

Reese et al., J. Am. Chem. Soc. Vol. 89, pages 3366 to 3368 (1967).
Corey et al., I, J. Am. Chem. Soc. Vol. 90, pages 3245 to 3247 (1968).
Corey et al. II, J. Am. Chem. Soc. Vol. 92, pages 2586 to 2587 (Apr. 22, 1970).

*Primary Examiner*—John D. Randolph
*Attorney*—Paul L. Sabatine and Steven D. Goldby

[57] ABSTRACT

Novel 4'-lower alkoxytetrahydropyran-4'-yl ethers of prostaglandins. The compounds possess valuable pharmacological properties as modifiers of smooth muscle activity, gastric secretion, blood pressure, lipolysis and the reproductive system. The compounds also induce labor and menses and they can be used for the relief of asthma and nasal congestion. The compounds also have valuable pharmacological properties, as platelet anti-clumping agents and for the inhibition of peptic ulcers.

27 Claims, No Drawings

NOVEL ALKOXYTETRAHYDROPYRANOL ETHERS OF PROSTAGLANDINS

DESCRIPTION OF THE INVENTION

This invention relates to both novel and useful 4'-(lower)alkoxytetrahydropyran-4'-yl ethers of prostaglandins, the prostaglandin nucleus thus bearing a new group represented by Formula I:

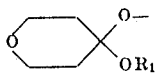

Formula I wherein $-OR_1$ collectively is a lower alkoxy group and $R_1$ singly is a lower alkyl moiety, and wherein the ether group is bonded on any one of, or on all of the C-9, C-11, C-15 and C-19 positions of the prostaglandin nucleus.

The novel prostaglandin ether compounds of the present invention can be represented by the Formula II:

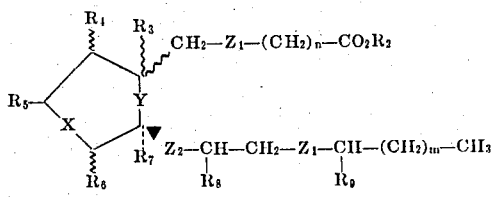

Formula II wherein:

$R_2$ is hydrogen or a lower alkyl group;

$R_3$ is hydrogen when $R_7$ is hydrogen and y is a single covalent bond and $R_3$ is absent when $R_7$ is absent and y is a double covalent bond;

$R_4$ is keto, a

group or

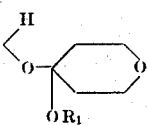

$R_5$ is hydrogen or

$R_6$ is hydrogen,

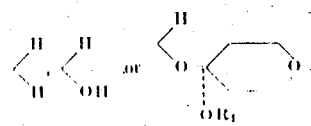

$R_7$ is hydrogen when $R_3$ is hydrogen and y is a single bond and $R_7$ is absent when $R_3$ is absent and y is a double bond;

$R_8$ is

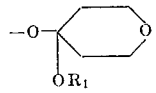

$R_9$ is hydrogen or

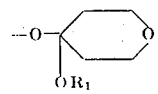

$Z_1$ is an unsaturated carbon carbon cis or trans group $-CH=CH-CO$ or a saturated carbon carbon group $-CH_2CH_2-$;

$Z_2$ is an unsaturated carbon carbon trans group $-CH=CH-$ or it is a saturated carbon carbon $-CH_2CH_2-$;

x is a carbon carbon single covalent bond or it is a carbon carbon covalent double bond with the proviso as set forth for $R_5$ and $R_6$ above;

y is a carbon carbon single covalent bond or it is a carbon carbon covalent double bond with the proviso as set forth for $R_3$ and $R_7$ above;

N is 1 to 5 and m is 0 to 5; and, the non-toxic salts thereof.

The novel compounds of Formula II can be conveniently named as ethers of prostaglandins such as 4'-(lower)alkoxytetrahydropyran-4'-yl prostaglandin ether or the compounds can be named as 4'-(lower)alkoxytetrahydropyran-4'-yloxy-prostaglandins. In the disclosure and the accompanying claims the compounds are named according to the latter naming system.

The term lower alkoxy appearing above and elsewhere in the instant specification denotes the straight and branched chain alkoxy groups of one to seven carbon atoms inclusive, such as methoxy, ethoxy, n-propoxy, butoxy, sec-butoxy, amoxy, isoamoxy, hexyoxy, heptoxy, isobutoxy, isopropoxy, and the like.

The chemical term lower alkyl used above and throughout the disclosure is represented by the straight and branched chain alkyl groups of one to seven carbon atoms inclusive, such as, methyl, ethyl, n-propyl, iso-propyl, n-butyl, sec-butyl, pentyl, neopentyl, n-hexyl, isohexyl, heptyl, and the like.

The pharmaceutically acceptable, non-toxic salts embraced by the 4'-(lower)-alkoxytetrahydropyran-4'-yloxy prostaglandins of Formula II and elsewhere in the disclosure includes the non-toxic alkali metal and the non-toxic alkaline earth metal bases such as sodium, potassium, calcium and magnesium, hydroxides and carbonates thereof, the ammonium salts and substituted ammonium salts, for example, the non-toxic salts of trialkylamines such as trimethylamine, triethylamine and triisopropylamine, and other amines such as morpholine, diethylamine, dimethylamine, methyl cyclohexylamine, glucosamine, procaine, dibenzlamine, triethanolamine, N-benzyl-β-phenylathylamine, ethyldimethylamine, benzylamine, N-(lower)alkyl piperdines, such as N-ethylpiperdine, N-methylpiperdine and other pharmaceutically acceptable amines. Also, non-toxic salts with monoalkyl and dialkylamines, and salts formed from compounds of Formula II ($R_2$=H) and tetra-alkylammonium hydroxides. The latter are generally art called therapeutically acceptable quaternary ammonium salts.

The numbering system and the stereochemistry nomenclature used for the prostaglandins of the invention is the art accepted numbering and nomenclature. That is, the cyclopentane ring of the prostanoic acid is numbered 8 through 12 inclusive, the carboxyl side chain attached to the cyclopentane ring at its 8 position and the alkyl side chain attached to the cyclopentane at its 12 position. The stereochemistry of the substituents on the 5-membered cyclopentane ring may be α-oriented or β-oriented, as indicated by a wavy line. The dashed line indicates an α-orientation and the solid wedged line indicates a β-orientation; that is, α-substituents are oriented on the opposite side of the cyclopentane ring as the ω-terminal chain, and β-substituents are oriented in the opposite sense, that is, on the same side as the alkyl side chain. The substituents attached to the alkyl side chain may have a sinister (S) or rectus (R) configuration which for these compounds in the projection shown, is the equivalent nomenclature of α and β respectively. The 4'-(lower)alkoxytetrahydropyran-4'-yloxy prostaglandins depicted by Formula II and elsewhere in the specification and accompanying claims includes the analogues and all the diastereomers thereof, and in addition the enantiomeric forms and such mixtures as are designated racemates. In the general formulae as illustrated, the substitutents at position $R_4$, $R_5$, and the like as depicted by

and the like, indicates in the formulae shown that both groups, for example, the hydrogen group and the hydroxyl group, are bonded to the carbon atom of the cyclopentane ring. The numbering system and stereochemistry nomenclature is disclosed in *Progress In The Chemistry of Fats And Other Lipids*, Vol IX, Part 2, pages 233 to 236, 1968, Pergamon Press, New York; and, *J. Lipids Research*, Vol 10, pages 316 to 319, 1969.

DESCRIPTION OF EMBODIMENTS

The novel 4'-(lower)alkoxytetrahydropyran-4'-yloxy prostaglandins of Formula II can be prepared from the corresponding hydroxy prostaglandins represented by Formula III or from prostaglandin intermediates represented by Formula IV:

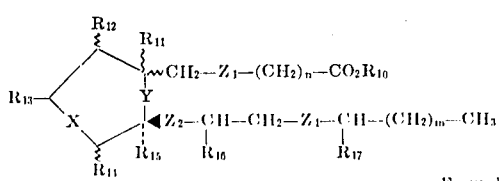

Formula III

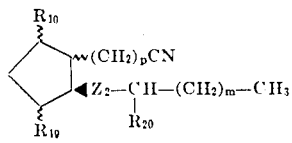

Formula IV wherein Formula III:

$R_{10}$ is hydrogen or a lower alkyl group;

$R_{11}$ is hydrogen when $R_{15}$ is hydrogen and y is a single covalent bond and $R_{11}$ is absent when $R_{15}$ is absent and y is a double covalent bond;

$R_{12}$ is keto group or

$R_{13}$ is hydrogen or

$R_{14}$ is hydrogen,

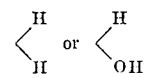

$R_{15}$ is hydrogen when $R_{11}$ is hydrogen and y is a single bond and $R_{15}$ is absent when $R_{11}$ is absent and y is a double bond;

$R_{16}$ is a hydroxyl group;

$R_{17}$ is hydrogen or hydroxyl;

$Z_1$ is an unsaturated carbon carbon cis or trans group —CH=CH—CO or a saturated carbon carbon group —$CH_2CH_2$—;

$Z_2$ is an unsaturated carbon carbon trans group —CH=CH— or it is a saturated carbon carbon —$CH_2CH_2$ — group;

x is a carbon carbon single covalent bond or it is a carbon carbon covalent double bond with the proviso as set forth for $R_{13}$ and $R_{14}$;

y is a carbon carbon single covalent bond or it is a carbon carbon covalent double bond with the proviso as set forth for $R_{11}$ and $R_{15}$;

n is 1 to 5 and m is 0 to 5; and, wherein in Formula IV:

$R_{18}$ is the NHCHO; $NHCOCH_3$; NHCO-alkyl, or $NH_2$;

$R_{19}$ is hydrogen,

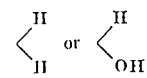

$R_{20}$ is hydroxyl, and p is 3 to 8 and m is 2 to 6, and the enantiomeric forms.

The novel 4'-(lower)alkoxytetrahydropyran-4'-yloxy prostaglandins of Formula II are prepared from the starting reactants represented by Formulae III and IV by contacting and reacting the reactants of Formulae III and IV under anhydrous conditions with an excess of 4'-(lower)alkoxy-5',6'-dihydro-2H-pyran; for example, with from about 1 to about 25 or more molecular equivalents for each hydroxyl group present in formulas III and IV to be etherified in the starting prostaglandin material. The reaction is carried out in an inert organic solvent and in the presence of a small amount of an acid catalyst. The reaction is usually carried out at a temperature of about 0° C to about 75° C, usually at room temperature of about 25° C, for about 10 minutes to about 96 hours to produce from the starting reactants and intermediates, compounds that can be converted to the corresponding compound of Formula II.

Exemplary of suitable inert, organic solvents for performing the reaction generally includes halogenated solvents such as methylene chloride, chloroform, carbon tetrachloride and ethylene chloride, and other solvents such as tetrahydrofuran, dimethoxyethane, dimethylformamide, dimethylsulfoxide, dioxane, isobutyl ketone, diethyl ether, dimethyl ether benzene, ether benzene mixtures, cyclopentane, cyclooctane, n-hexane, n-heptane and the like.

Representative of acid catalysts for performing the reaction are p-toluenesulfonic acid, stannic chloride, stannic oxychloride, phosphorous pentachloride, phosphorous oxychloride, hydrochloric acid, boron trifluoride, boron trichloride etherate, zinc chloride, mixtures thereof and the like.

The 4'-(lower)alkoxy-5',6'-dihydro-2H-pyran starting material used to form the prostaglandins of Formula II of this invention can be synthesized by well known techniques. For example, the compound tetrahydro-4'-pyrone is reacted with a lower alkanol under acidic reaction conditions to form the intermediate compound 4',4'-di(loweralkoxy)-tetrahydropyran, which latter compound is distilled in the presence of toluenesulfonic acid or mesitylenesulfonic acid to produce the starting reactant 4'-(lower)alkoxy-5',6'-dihydro-2H-pyran. The reaction of the 4'-(lower)alkoxy-5',6'-dihydro-2H-pyran with the starting reactants of Formulae III and IV also produces small amounts of 5',6'-dihydro-2H-pyran-4'-yl ethers. To obtain increased quantities of 4'-(lower)alkoxy-5',6'-dihydro-2H-pyran lesser amounts of acid catalysts and shorter reaction times are used for carrying out the reaction. The 4'-(lower)alkoxy-5',6'-dihydro-2H-pyran can be separated from any formed 5',6'-dihydro-2H-pyran-4'-yl ether by conventional chromatographic techniques using synthetic magnesium silicate, silica gel, exchange resins, alumina and the like. The reaction is described in *J. Am. Chem. Soc.*, Vol 89, pages 3366 to 3368, 1967 and in *Tetrahedron*, Vol 26, pages 1023 to 1030, 1970.

The lower alkanols suitable for the reaction include the lower alkanols of one to seven carbon atoms inclusive of either the straight or the branched chain type. Suitable alkanols include methanol, ethanol, propanol, isopropanol, n-butanol, isobutanol, pentanol, amyl alcohol, hexanol, heptanol, and the like, to form the corresponding starting pyran, such as 4'-methoxy-5',6'-dihydro-2H-pyran; 4'-ethoxy-5',6'-dihydro-2H-pyran; 4'-propoxy-5',5'-dihydro-2H-pyran; 4'-butoxy-5',6'-dihydro-2H-pyran; 4'-isopropoxy-5',6'-dihydro-2H-pyran; 4'-pentoxy-5',6'dihydro-2H-pyran; and the like.

The starting prostaglandin materials of Formula III and IV used to synthesize the compounds of Formula II are prepared by art known biosynthetic or chemical synthetic ways or they are readily obtained from commercial sources. The starting materials are prepared by the biosynthetic way by isolating the prostaglandin from natural sources, for example, the vesicular glands of sheep, or by the enzymatic conversion from fatty acid substrates, such as arachidonic acid, and, depending on the substituent desired, routinely chemically transforming double bonds to single bonds by hydrogenation, converting keto groups to hydroxymethylene groups by reduction, by dehydrating to introduce double bonds, by forming carbinol derivatives by treating carbo(lower)alkoxy groups with an alkali metal alumino hydride reducing agent such as lithium aluminum hydride and the like. Specific prior art methods that set forth the procedures useful for providing all of the natural and naturally derived starting compounds embraced by Formula III are found in *Science*, Vol 158, pages 382 to 391, 1967; *Recueil*, Vol 85, pages 1233 to 1250, 1966; *Biochem. Biophys. Acta.*, Vol 106, pages 215 to 217, 1965; *Agnew. Chem. Inter. Ed.*, Vol 4, pages 410 to 416, 1965; *Experientia*, Vol 21, pages 113 to 176, 1965; *Recueil*, Vol 85, pages 1251 to 1253, 1966; and in other art recorded procedures.

The starting prostaglandin reactants and the intermediate prostaglandin reactants of Formulae III and IV can be chemically synthesized by well known procedures. For example, the prostaglandins can be synthesized from a common intermediate 11,15-bis(tetrahydropyranyl)ether of $9\alpha,11\alpha,15(S)$-trihydroxy-5-cis, 13-trans-prostadienoic acid over palladium on carbon followed by treatment with Jones reagent and hydrolysis to give the resulting prostaglandins as reported in *J. Am. Chem. Soc.*, Vol 92, pages 2586 to 2587, 1970, and references cited therein; as prepared by the reduction of 2-oxa-3-oxo-6-exo-(trans-3-(S)-hydroxy-hept-1-enyl)-endo-7-acetoxy-cis-bicyclo[3.3.0]octane followed by reduction and treatment with a Wittig reagent to give the corresponding prostaglandins as set forth in *J. Am. Chem. Soc.*, Vol 91, pages 5675 to 5677, 1969; by the total synthesis of prostaglandins via a tricarbocyclic intermediate as reported in *Tetrahedron Letters*, Vol 4, pages 307 to 310, 1970; by the total synthesis of prostaglandins from 2-oxabicyclo (3.3.0) oct-6-en-3-one, ibid, pages 310 to 311, 1970; and other reported chemical synthesis embracing the prostaglandins materials within Formula III such as the *J. Am. Chem. Soc.*, Vol 90, pages 3245 to 3247, 1968; ibid, Vol 91, pages 535 to 536, 1969; ibid, Vol 92, pages 397 to 398, 1970; and in *The Proceedings of the Robert A. Welch Foundation Conference on Chemical Research*, Vol XII, pages 51 to 79, 1969. The intermediate prostaglandin starting materials embraced by Formula IV are known to the art by the chemical synthetic route described in *J. Am. Chem. Soc.*, Vol 90, pages 3245 to 3247, 1968; and, ibid, pages 3247 to 3248, 1968; ibid, Vol 91, pages 535 to 536, 1969.

The 4'-(lower)alkoxy-5',6'-dihydro-2H-pyran-4'-yloxy prostaglandin ($R_2$=H) can be converted to its non-toxic, pharmaceutically acceptable salt by neutralizing the prostaglandin with an equivalent or an excess amount of the corresponding non-toxic salt forming organic or inorganic base. The salts are prepared by procedures known to the art, for example, equivalent or stoichiometric quantities of the prostaglandin and the organic base are dissolved in an inert organic solvent at room temperature or in a warmed solvent with a gentle mixing of the reacting prostaglandin and the base until all the reactants are in solution. The product or salt is obtained by chilling the resulting mixture to precipitate the powder or crystals, or the product can be isolated by the addition of a miscible diluent of low polarity, or by the use of standard evaporation techniques. The formation of inorganic pyran-prostaglandin salts is also carried out by procedures known to the art; for example, the prostaglandin is dissolved in an aqueous solution containing stoichiometric amounts or an excess amount of a non-toxic base forming inorganic sodium, calcium and potassium salts, or the like. This reaction can be carried out in the presence of an inert organic solvent, and the product is obtained by procedures such as the evaporation of the aqueous medium, or the organic medium, by the addition of miscible solvents of low polarity, or by chilling the mixture to precipitate the product.

The lower alkyl esters of the compounds are obtained by art known procedures, such as, the treatment of the prostaglandin acid with a solution containing diazo(lower)alkanes to produce the prostaglandin ester. Esterification of the prostaglandin acid is performed by reacting the acid with the diazoalkane, for example, diazomethane, diazoethane, diazopropane, diazobutane, etc., in an inert organic solvent, for example, lower alkanols, symmetrical and unsymmetrical ethers, halogenated solvents. Examples of solvents are ethanol, methanol, diethyl ether, methylethyl ether, tetrahydrofuran, acetone, chloroform, etc., or with mixtures thereof. The esterification reaction is performed at a temperature of 0° to 75° C, usually at room temperature and atmospheric pressure, with the ester recovered by evaporation of the solvent and like chemical techniques. The esterification reaction is described in *Organic Chemistry*, by Fieser and Fieser, pages 180 to 181, 1944.

The following examples are set forth as representative methods illustrative of the spirit of the present invention. These examples are not to be construed as limiting the scope of the invention as other functionally equivalent means will be readily apparent to those skilled in the subject art.

EXAMPLE 1

Synthesis of 11,15-bis(methoxytetrahydropyran-4'-yloxy)-5-cis,13-trans-prostadienoic,(11,15-bis $CH_3O$-THP of $PGF_2$ ). Finely powdered 5-triphenylphosphonio pentanoic acid, 530 mg (1.20 m mol) is heated to 75° C in vacuo for 1 hr and is then placed under an argon atmosphere. Dry dimethyl sulfoxide, 0.8 ml, is added to dissolve the warm solid and the resulting solution is cooled to ambient temperature. Next, 1.15 ml (2.30 m mol) of 2 M sodio methylsulfinylcarbanide, in dimethyl sulfoxide, is added with constant stirring. Then, crude hemi acetal, Formula V,

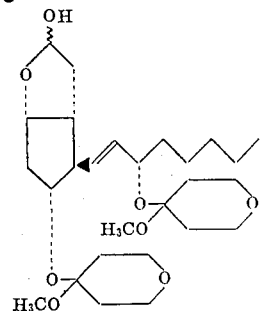

Formula V in 0.50 ml of dry dimethyl sulfoxide is added after 5 minutes. The mixture is stirred at ambient temperature for 1.0 hr, the dimethylsulfoxide is removed under reduced pressure (0.1 mm) and the residue is diluted with distilled water. The pH of the aqueous phase is adjusted to 9–10 with solid potassium carbonate. The neutral components are extracted with ethyl acetate:ether (1:1) and then the aqueous phase is acidified with oxalic acid to pH about 3. Extraction with 1:1 pentane: ether is followed by washing the extracts with saturated brine and then drying over dry magnesium sulfate, to yield the desired 11,15-bis $CH_3O$-THP of $PGF_{2\alpha}$.

EXAMPLE 2

Synthesis of 11,15-bis(methoxytetrahydropyran-4'-yloxy)-9-oxo-5-cis,13-trans-prostadienoic acid,(11,15-bis $CH_3O$ THP of $PGE_2$). A mixture of the crude 11,15-bis $CH_3O$ THP of $PGF_2$ (as synthesized in Example 1), 70.0 mg and 1.40 ml of acetone is cooled to −10° C. Then 59.0 μl of Jones' Reagent is added over 5 minutes with constant stirring. After an additional 25 minutes at −10° C, 59 μl of isopropyl alcohol is added and after 5 minutes the mixture is diluted with 10 ml of ethyl acetate. The organic phase is separated, washed with water and saturated brine, dried over anhydrous magnesium sulfate to yield 11,15-bis $CH_3O$ THP of $PGE_2$.

EXAMPLE 3

Synthesis of 11,15-bis(methoxytetrahydropyran-4'-yloxy)-13-trans-prostenoic acid,(11,15-bis $CH_3O$ THP of $PGF_{1\alpha}$). A mixture of 0.08 mmol of 11,15-bis $CH_3O$ THP of $PGF_{2\alpha}$, (as synthesized in Example 1) and 9.6 mg of 5% Pd/C in 5.0 ml of methanol is hydrogenated at −15° to −20° C at atmospheric pressure. After about 3 hrs the mixture is filtered through Celite 545 and concentrated in vacuo to give the product, also containing small amounts of 13,14-dihydro-bis $CH_3O$ THP of $PGF_{1\alpha}$.

EXAMPLE 4

Synthesis of 11,15-bis(methoxytetrahydropyran-4'-yloxy)-9-oxo-13-trans-prostenoic acid,(11,15-bis $CH_3O$ THP of $PGE_1$). To a solution, cooled to −10° C of the compound synthesized in Example 3 in 1.48 ml of acetone is added 59.5 μl of Jones' Reagent. After stirring for 5 minutes at −10° C, 59.5 μl of isopropyl alcohol is added and stirring is continued for 5 minutes at −10° C. After dilution with ethyl acetate the organic phase is washed with water and saturated brine, dried over anhydrous magnesium sulfate and concentrated to yield the product.

EXAMPLE 5

To a solution of 500 mg of 9α,11α,15(S)-trihydroxy-13-trans-prostenoic acid and 25 ml of anhydrous dioxane there is added 4 ml of 4'-methoxy-5',6'-dihydro-2 H-pyran, and the solution is continually stirred to ensure a uniform mixture of the ingredients. Next, about 5 to 7 ml of the mixture is distilled off to remove moisture and the remaining mixture is cooled to room temperature. To the room temperature mixture, at about 25° C, is added about 25 mg of an acid catalyst, p-toluenesulfonic acid, and the resulting reaction mixture is maintained at this temperature for 96 hours. Next, the reaction mixture is washed with an aqueous 5 percent solution carbonate and then with aliquots of water until a neutral pH is obtained for the mixture. Next, the mixture is dried over anhydrous sulfate and evaporated to dryness. The dry residue obtained is dissolved in n-hexane and it is chromatographed through a column of neutral silica to give 9α,11α,15(S)-tris(4' - methoxytetrahydropyran-4'-yloxy)-13-trans-prostenoic acid.

EXAMPLE 6

Repeating the procedure of Example 5 but replacing 9α,11α,15(S)-trihydroxy-13-trans-prostenoic acid with:
9β,11α,15(S)-trihydroxy-13-trans-prostenoic acid,
9α,11α,15(S)-trihydroxy-5cis,13-trans-prostadienoic acid,
9β,11α,15(S)-trihydroxy-5-cis,13-trans-prostadienoic acid,
9β,11α,15(R)-trihydroxy-13-trans-prostenoic acid,
racemic 9β,11β,15(R)-trihydroxy-5-cis,13-trans-prostadienoic acid, and
9α,11α,15(S)-trihydroxy-5-cis,13-trans,17-cis-prostatrienoic acid, the following ethers are formed:
9β,11α,15(S)-tris-(4'-methoxytetrahydropyran-4'-yloxy)-13-trans-prostenoic acid,
9β,11α,15(S)-tris(4'-methoxytetrahydropyran-4'-yloxy)-5-cis,13-trans-prostadienoic acid,
9β,11β,15(R)-tris(4'-methoxytetrahydropyran-4'-yloxy)-13-trans-prostadienoic acid,
racemic 9β,11β,15(R)-tris (4'-methoxytetrahydropyran-4'-yloxy)-5-cis,13-trans-prostadienoic acid,
9α,11α,15(S)-tris-(4'-methoxytetrahydropyran-4'-yloxy)-5-cis, 13-trans-prostadienoic acid, and,
9α,11α,15(S)-tris-(4'-methoxytetrahydropyran-4'-yloxy)-5-cis, 13-trans, 17-cis-prostatrienoic acid.

EXAMPLE 7

To a solution of 500 mg of 15(S)-hydroxy-9-oxo-10,13-trans-prostadienoic acid and 20 ml of methylene chloride at 25° C there is added an excess, 1.5 ml of freshly prepared 4'-methoxy-5', 6'-dihydro-2H-pyran and 40 mg anhydrous p-toluenesulfonic acid catalyst, and the mixture is gently stirred for about 15 to 20 minutes. Next, the reaction mixture is quenched by adding about 5 to 6 drops of pyridine and it is diluted with about 50 ml of ether. Then, the mixture is washed with 10 ml aliquots of 50 percent brine and with 10 ml of saturated brine. Finally, the extracted organic phase is dried over anhydrous magnesium sulfate, and concentrated under house vacuum to give 15(S)-(4'-methoxytetrahydropyran-4'-yloxy)-9-oxo-10, 13-trans-prostadienoic acid.

EXAMPLE 8

Repeating the procedure of Example 7 but substituting for 15(S)-hydroxy-9-oxo-10,13-trans-prostadienoic acid the following:
15(S)-hydroxy-9-oxo-5-cis,10,13-trans-prostatrienoic acid,
15(R)-hydroxy-9-oxo-10,13-trans-prostadienoic acid,
15(R)-hydroxy-9-oxo-5-cis, 10, 13-trans-prostatrienoic acid, and,
15(S) , 19-dihydroxy-9-oxo-10, 13-trans-prostadienoic acid, the following ethers are obtained:
15(S)-(4'-methoxytetrahydropyran-4'-yloxy)-9-oxo-5-cis, 10, 13-trans-prostatrienoic acid,
15(R)-(4'-methoxytetrahydropyran-4'-yloxy)-9-oxo-10, 13-trans-prostadienoic acid,
15(R)-(4'-methoxytetrahydropyran-4'-yloxy)-9-oxo-5-cis,10,13-trans-prostatrienoic acid, and
15(S), 19-bis-(4'-methoxytetrahydropyran-4'-yloxy)-9-oxo-10, 13-trans-prostadienoic acid.

EXAMPLE 8

To a 500 ml roundbottom borosilicate flask containing 0.4 g of 15(S)-hydroxy-9-oxo-8(12),13-trans-prostadienoic acid in 15 ml of benzene there is added 2 ml of fresh 4'-ethoxy-5', 6'-dihydro-2H-pyran and 0.03 ml of phosphorus oxychloride and the flask heated to about 30° C for 1 ¼ hour. Next, the solution is cooled to room temperature and diluted with 50 ml of ether, washed with 50 percent brine and saturated brine until the solution is neutral. Finally, the organic phase is dried over anhydrous Mg SO$_4$, filtered and freed of solvent under reduced pressure to give, after purification by column chromatography, 15(S)-(4'-ethoxytetrahydropyran-4'-yloxy)-9-oxo-8(12),13-trans-prostadienoic acid.

EXAMPLE 9

Following the procedure of Example 8, but replacing 15(S)-hydroxy-98(12), 13-trans-prostadienoic acid with:
15(S)-hydroxy-9-oxo-5-cis, 10, 13-trans-prostatrienoic acid,
15(R)-hydroxy-9-oxo-5-cis, 10, 13-trans-prostatrienoic acid,
15(R)-hydroxy-9-oxo-10, 13-trans-prostadienoic acid,
15(S), 19-dihydroxy-9-oxo-10, 13-trans-prostadienoic acid, the following ethers are formed:
15(S)-(4'-ethoxytetrahydropyran-4'-yloxy)-9-oxo-5-cis, 10,13-trans-prostatrienoic acid,
15(R)-(4'-ethoxytetrahydropyran-4'-yloxy)-9-oxo-5-cis, 10,13-trans-prostatrienoic acid,
15(R)-(4'-ethoxytetrahydropyran-4'-yloxy)-9-oxo-10,13 -trans-prostadienoic acid, and
15(S), 19-bis(4'-ethoxytetrahydropyran-4'-yloxy)-9-oxo-10,13-trans-prostadienoic acid.

EXAMPLE 10

Two ml of 4'-propoxy-5', 6'-dihydro-2H-pyran is added to a solution of 0.5 g of 9α, 11α, 15(S)-trihydroxy-13-trans-prostenoic acid in 30 ml of benzene and about 5 ml of the mixture is distilled to remove any moisture, and the remaining mixture is cooled to room temperature. To the cooled mixture is then added 0.1 g of p-toluenesulfonic acid and the resulting mixture is allowed to stand at room temperature for about 48 hours. Following this reaction period, the mixture is washed with 5 percent sodium carbonate solution and with distilled water until an essentially neutral pH is obtained for the organic phase. Then, the organic phase is dried over anhydrous sodium sulfate and evaporated to dryness. The dry residue is dissolved in hexane containing a little ethyl acetate and purified by column chromatography on a neutral alumina, using a benzene-ethyl-acetate gradient to give 9α, 11α, 15(S)-tris-(4'-propoxytetrahydropyran-4'-yloxy)-13-trans-prostenoic acid.

EXAMPLE 11

The procedure of Example 10 is repeated in this example and all the conditions are repeated, except that 4'-propoxy-5',6'-dihydro-2H-pyran and 9α, 11α, 15(S)-trihydroxy-13-trans- prostenoic acid are replaced by 4'-isopropoxy-5',6'-dihydro-2H-pyran and 9α, 11α, 15(S)-trihydroxy-5-cis, 13-trans-prostadienoic acid to give the product 9α, 11α, 15(S)-tris(4'-isopropoxytetrahydropyran-4'-yloxy)-5-cis,13-trans-prostadienoic acid.

EXAMPLE 12

To 450 mg of 9-formylamino, 11α,15(S)-dihydroxy-13-trans-prostenonitrile, having the following structure, Formula VI,

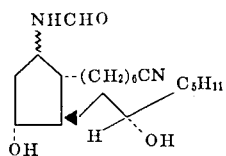

Formula VI and prepared according to *J. Am. Chem. Soc.*, Vol 90, pages 3245 to 3248, 1968, in 5 ml of methylene chloride there is added 1.5 ml of distilled 4'-methoxy-5',6'-dihydro-2H-pyran and 5 mg of anhydrous p-toluenesulfonic acid and the mixture stirred for about 20 minutes at room temperature. After quenching the reaction with a few drops of pyridine and ether, the product is obtained by evaporation of the solvent in vacuo. Next, the product 9-formamido, 11α,15(S)-bis (4'-methoxytetrahydropyran-4'-yloxy)-13-trans-prostenonitrile, of the following structure, Formula VII

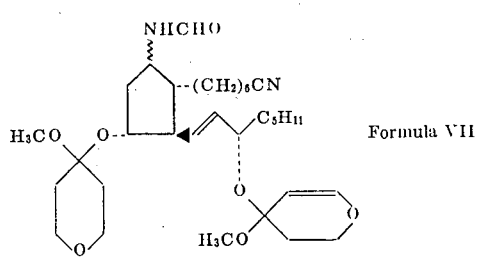

Formula VII is converted to the amino acid by the hydrolysis of the cyano group and deformylation with 4 chemical equivalents of KOH in MeOH—H₂O at 110°–125°C for 16–17 hours in a sealed tube. The amino product is isolated by extraction with dichloromethane after addition of water and excess solid carbon dioxide. The amino group at the 9 position is next converted to its N-bromo derivative with N-bromosuccinimide in dichloromethane; then base catalyzed dehydrobromination, using alkoxides or amidines hydrolysis in dilute aqueous acetic acid and chromatography on silica to give 11α,15(S)-bis(4'-methoxytetrahydropyran-4'-yloxy)-9-oxo-13-trans-prostenoic acid.

EXAMPLE 13

Following the procedure of Example 12, but replacing 9-formamido-11α,15(S)-dihydroxy-13-trans-prostenonitrile with:

racemic 9-formamido-11β,15(S)-dihydroxy-13-trans-prostenonitrile, racemic 9-formamido-11α,15(R)-dihydroxy-13-trans-prostenonitrile, racemic 9-formanido11β15(R)-dihydroxy-13-trans-prostenonitrile, and enantio 9-formamido-11β, 15(R)-dihydroxy-13-trans-prostenonitrile, also prepared by the method outlined In *J. Am. Chem. Soc.*, Vol 90, pages 3245 to 3248, 1968; the following ethers are formed:

racemic 11β, 15(S)-bis (4'-methoxytetrahydropyran-4'-yloxy)-9-oxo-13-trans-prostenoic acid, racemic 11α, 15(R)-bis (4'-methoxytetrahydropyran-4'-yloxy)-9-oxo-13-trans-prostenoic acid, racemic 11β,15(R)-bis (4'-methoxytetrahydropyran-4'-yloxy)-9-oxo-13-trans-prostenoic acid, and enantio 11β,15(R)-bis (4'-methoxytetrahydropyran-4'-yloxy)-9-oxo-13-trans-prostenoic acid.

EXAMPLE 14

The compounds, 9β-hydroxy, 11α, 15(S)-bis (4'-alkoxytetrahydropyran-4'-yloxy)-13-trans-prostenoic and 9β-hydroxy, 1α, 15(S)-bis (4'-alkoxytetrahydropyran-4'-yloxy)-13-trans-prostenoic acid are prepared by the reduction of the corresponding 11α, 15(S)-bis (4'-alkoxytetrahydropyran-4'-yloxy)-9-oxo-13-trans-prostenoic acid using NaB(R)ₙH₄₋ₙ wherein R is a lower alkyl of 1 to 4 and n is 0 to 4, in an inert organic solvent at 0° to 30°C for 15 minutes to 1 hour to give the set forth prostaglandins. For example, the reduction is performed with sodium borohydride in methanol at 0°C for 30 minutes followed by chromatographic separation to give the prostaglandin ethers.

EXAMPLES 15 to 18

The α-homo analogues of 11, 15-bis(4'-lower alkoxytetrahydroyran-4'-yloxy)-5-cis, 13-trans-prostadienoic acid, (11, 15-bis RO THP of PGF₂ₐ) ; of 11, 15-bix(4'-lower alkoxytetrahydropyran-4'-yloxy)-9-oxo-5-cis, 13-trans-prostadienoic acid, (11,15-bis RO THP of PGF₁ₐ); of 11,15-bis(4'-lower alkoxytetrahydropyran-4'-yloxy)-13-trans-prostenoic acid, (11,15-bix RO THP of PGF₁ ); and of 11,15-bix (lower alkoxytetrahydropyran-4'-yloxy)-9-oxo-13-trans-prostenoic acid, (11,15-bis RO THP of PGE$_1$) are prepared according to the procedure as set forth in Examples 1 to 4 inclusive, and all reaction conditions and reagents are as described except that 5-triphenylphosphonio hexanoic acid $\phi_3P^+CH_2(CH_2)_4$ CO$_2$H Br$^-$($\phi=\phi_3$P-CH$_2$ (CH$_2$)
$_3$CO$_2$H Br$^-$ to give the desired compounds.

EXAMPLE 19

In this preparation, the 15-eipmer of the hemi-acetal employed in Examples 15 to 18 inclusive, also prepared by the method set forth in *J. Am. Chem. Soc.*, Vol 92, pages 2586 to 2587, 1970, and the references cited therein, and shown here as Formula VIII as follows:

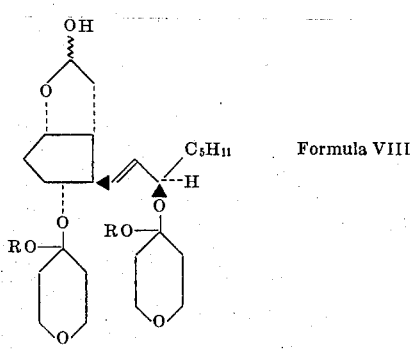

Formula VIII in either this form, or as the enantiomer is reacted with $\phi_3P^+_2(CH_2)_3$ CO$_2$H Br$^-$ according to Examples 15 to 18 inclusive, to produce the following prostaglandin ethers:

11α, 15(R)-bis(4'-lower alkoxytetrahydropyran-4'-yloxy)-9α-hydroxy-5-cis, 13-trans-prostadienoic acid,
  enantio 11α, 15(R)-bis (4'-lower alkoxytetrahydropyran-4'-yloxy)-9α-hydroxy-5-cis, 13-trans-prostadienoic acid,
11α, 15(R)-bis (4'-lower alkoxytetrahydropyran-4'-yloxy)-9-oxo-5-cis, 13-trans-prostadienoic acid, and,
  enantio 11α, 15(R)-bis(4'-lower alkoxytetrahydropyran-4'-yloxy)-9-oxo-5-cis, 13-trans-prostadienoic acid.

EXAMPLE 20

Examples of additional (4'-lower alkoxytetrahydropyran-4'-yloxy) prostaglandins that are prepared in the mode and manner of the present disclosure are as follows:

11α, 15(S)-bis(4'-methoxytetrahydropyran-4'-yloxy)-9-oxo-5-cis, 13-trans-prostadienoic acid,
11α, 15(S)-bis(4'-methoxytetrahydropyran-4'-yloxy)-9-oxo-5-cis, 13-trans, 17-cis-prostatrienoic acid,
11α, 15(S)-bis(4'-butoxytetrahydropyran-4'-yloxy)-9-oxo-prostanoic acid,
11α, 15(S)-bis (4'-ethoxytetrahydropyran-4'-yloxy)-9-oxo-13-trans-8-iso-prostenoic acid,
11α, 15(S)-bis (4'-methoxytetrahydropyran-4'-yloxy)-9-oxo-13-trans-ω-homo-prostenoic acid,
15(S)-(4'-propoxytetrahydropyran-4'-yloxy)-9-oxo-10,13-trans-prostadienoic acid,
15(S)-(4'-isopropoxytetrahydropyran-4'-yloxy)-9-oxo-5-cis, 10, 13-trans-prostatrienoic acid,
9α, 11α, 15(S)-tris (4'-sec-butoxytetrahydropyran-4'-yloxy)-13-trans-prostenoic acid;
9α, 11α, 15(S)-tris(4'-ethoxytetrahydropyran-4'-yloxy)-5-cis, 13-trans-prostadienoic acid,
15(S)-(4'-amyloxytetrahydropyran-4'-yloxy)-9-oxo-8(12),13-trans-prostadienoic acid;
15(S),19-bis(4'-ethoxytetrahydropyran-4'-yloxy)-9-oxo-10,13-trans-prostadienoic; and the like.

DESCRIPTION OF INVENTIVE APPLICATIONS

The novel prostaglandin ethers of the invention as embraced by Formula II possess valuable and useful properties. The prostaglandin ethers are inventively characterized by their ability to serve as a source of the parent prostaglandin following the metabolic hydrolysis of the prostaglandin from the 4'-lower alkoxytetrahydropyran-4'-yl moiety. For example, prostaglandin ethers with a C-9 keto group and one or both of the C-11 and C-15 positions substituted with a 4'-lower alkoxytetrahydropyran-4'-yl group on (in vivo) separation of the latter group with formation of hydroxyl groups make available prostaglandins that possess many pharmacological properties, including the ability to lower blood pressure and relieve asthma and nasal congestion. These parent prostaglandins are useful for the management of hypertension in avians, mammals, including humans, farm animals and in laboratory animals. Also, following the liberation of the 4'-lower alkoxytetrahydropyran-4'-yl groups and with concomitant formation of hydroxyl groups in vivo, these will produce for example, 11α, 15(S)-dihydroxy-9-oxo-5-cis, 13-trans-prostadienoic acid; the latter compound when administered at the rate of 0.5 μg/min intravenously, or 2 mg/2 hrs intravaginally, or 0.5 mg/2 hrs orally, is known to be effective in humans for the induction of labor. Representative prostaglandin ethers for obtaining prostaglandins that possess the set forth pharmacological properties include 11α, 15(S)-bis (4-lower alkoxytetrahydropyran-4'-yloxy)-9-oxo-13-trans-prostenoic acid; 11α,15(S)-bis(4'-lower alkoxytetrahydropyran-4'-yloxy)-9-oxo-5-cis,13-trans-prostadienoic acid; 11α,15(S)-bis(4'-lower alkoxytetrahydropyran-4'-yloxy)-9-oxo-5-cis,13-trans,17-cis-prostatrienoic acid and the like.

The prostaglandin ethers of the invention substituted at the C-9, C-11 and C-15 positions with a 4'-lower alkoxytetrahydropyran-4'-yl group on liberation of the latter groups, and with concomitant in vivo formation of hydroxyl groups at the C-9, C-11 and C-15 positions, will produce prostaglandins possessing smooth muscle stimulating activity, for example, 9α,11α, 15(S)-trihydroxy-13-trans-prostenoic acid, 9α,11α,15(S)-trihydroxy-5-cis,13-trans-prostadienoic acid, and the like, which latter compounds when administered intravenously (5 μg/min) or intravaginally (25 mg/2 hrs) will induce labor in humans. Exemplary of prostaglandin ethers that furnish the corresponding prostaglandins which latter prostaglandins possess smooth muscle activity are 9α,11α,15(S)-tris(4'-lower alkoxytetrahydropyran-4'-yloxyl)-13-trans-prostenoic acid; 9α,11α,15(S)-tris(4'-lower alkoxytetrahydropyran-4'-yloxy)-5-cis,13-trans-prostadienoic acid; 9α,11α,15(S)-tris(4'-lower alkoxytetrahydropyran-4'-yloxy)-5-cis,13-trans, 17-cis-prostatrienoic acid, and the like.

The prostaglandin ethers of the invention that supply in vivo a physiologically active prostaglandin characterized by a C-9 keto group and (1) a C-11 and C-15 hydroxyl group or (2) a C-9, C-11 and C-15 hydroxyl group are physiologically useful for not only inducing labor but also menses and for the termination of pregnancy. Representative of prostaglandin ethers that can serve as an in vivo source of physiologically active prostaglandins when administered for example intravenously at the rate of 0.1 to 1.0 μg/min, calculated as freed prostaglandins are ethers such as 9α,11α,15(S)-tris(4'-lower alkoxytetrahydropyran-4'-yloxy)-13-trans-prostenoic acid; 9α,11α,15(S)-tris(4'-lower alkoxytetrahydropyran-4'-yloxy)-5-cis,13-trans-prostadienoic acid; 9α,11α,15(S)-tris(4'-lower alkoxytetrahydropyran-4'-yloxy)-5-cis,13-trans,17-cis-prostatrienoic acid; 11α,15(S)-bis(4'-lower alkoxytetrahydropyran-4'-yloxy)-9-oxo-5-cis,13-trans-prostadienoic acid; 11α,15(S)-bis(4'-lower alkoxytetrahydropyran-4'-yloxy)-9-oxo-13-trans-prostenoic acid; and the like.

The prostaglandin ethers can be used for the relief of asthma, nasal congestion and inhibition of lipolysis by supplying from prostaglandin ethers substituted with a C-9 keto and a C-15 lower alkoxytetrahydropyran group or a prostaglandin ether substituted with a C-9 keto and at C-11 and C-15 a lower alkoxytetrahydropyran group the corresponding parent prostaglandins possessing the desired therapeutic utility. Exemplary of prostaglandin ethers of the invention for producing the corresponding prostaglandins include 15(S)-(4'-lower alkoxytetrahydropyran-4'-yloxy)-9-oxo-10,13-trans-prostadienoic acid; 15(S)-(4'-lower alkoxytetrahydropyran-4'-yloxy)-5-cis,10,13-trans-prostatrienoic acid; 11α,15(S)-bis(4'-lower alkoxytetrahydropyran-4'-yloxy)-9-oxo-5-cis,13-trans-prostadienoic acid; and the like.

The prostaglandin ethers of the invention substituted with a C-9 keto group and additionally with a C-15 or a C-11 and C-15 lower alkoxytetrahydropyran-4'-yloxy group are useful for the management of gastric secretions. These prostaglandin ethers release the natural anti-secretory prostaglandin in the stomach upon the acidic hydrolysis of the prostaglandin ether to free the prostaglandin group of the prostaglandin ether from the affixed pyranyloxy moiety. The prostaglandin ether's ability to release free prostaglandin under gastric-like environmental conditions is demonstrated by standard in vitro experiments using an artificial gastric juice consisting essentially of mineral acid, hydrochloric, at varying pH from 1 to 4.5 at 37° C. For example, 11α,15(S)-bis(4'-methoxytetrahydropyran-4'-yloxy)-9-oxo-5-cis,13-trans prostadienoic acid releases active 11α,15(S)-dihydroxy-9-oxo-5-cis,13-trans-prostadienoic acid at pH 2 to 4 and at 37° C. The immediately described prostaglandin ethers are therapeutically indicated fro regulating gastric secretions, that is, hyperacidity, because as the pH of the stomach reaches 4.5 to 5 the hydrolysis of the prostaglandin ether is essentially decreased, and, as the prostaglandin ether passes from the stomach into the intestine, the unwanted increased intestine peristalsis or increased intestinal motility with the accompanying bowel actions and diarrhea following administration of the natural form of the prostaglandins in the intestine are essentially absent for the prostaglandin ethers of the invention.

The prostaglandin ether's ability to release prostaglandin is determined by standard laboratory techniques, for example, by adding small amounts, 10 micrograms, 50 micrograms, etc., of the prostaglandin ether to hydrogen ion environments at varying pH and then detecting the presence of freed prostaglandin by conventional muscle bioassay. For example, the addition of 9α,11α,15(S)-tris(4'-methoxytetrahydropyran-4'-yloxy)-5-cis,13-trans-prostadienoic acid, and for racemic 9α,11α,15(S)-tris-(4'-methoxytetrahydropyran-4'-yloxy)-5-cis,13-trans-prostadienoic acid to a hydrogen ion environment, hydrochloric acid, indicated by bioassay, for example contraction of isolated rat uterine or gerbil colon strips, that from about pH 1 to 4.5, hydrolysis of the ether linkage occurs to release the corresponding prostaglandin.

The prostaglandin ethers of the invention possess desirable partition coefficients between aqueous and lipid phases and they are therefore adaptable for administering for their physiological effects from drug delivery systems, such as intrauterine contraception devices, skin drug delivery bandages and the like, manufactured from naturally occurring and synthetic polymeric materials. This novel and useful property of the prostaglandin ethers make possible their diffusion at measurable controlled rates through polymeric material such as polyvinylchloride, polyisoprene, polybutadiene, polyethylene, ethylene-vinyl acetate, collagen, polydimethylsiloxanes, hydrophilic hydrogels of esters of acrylic and methacrylic acids, polyvinyl acetates, propylene-vinyl acetate copolymers, and the like.

The novel prostaglandin ethers of the invention can be used by the pharmaceutical and the veterinary arts in a variety of pharmaceutical preparations or veterinary preparations. In these preparations, the new compounds are administrable in the form of tablets, pills, powders, capsules, injectables, solutions, suppositories, emulsions, dispersions, food premix and in other suitable forms. The pharmaceutical or veterinary preparation which contains the compound is conveniently admixed with a non-toxic pharmaceutical organic carrier or a non-toxic pharmaceutical inorganic carrier. Typical of pharmaceutically acceptable carriers, are for example, water, gelatine, lactose starches, magnesium stearate, talc, vegetable oils, polyalkylene glycols, petroleum jelly and other conventionally employed pharmaceutically acceptable carriers. The pharmaceutical preparation may also contain non-toxic auxiliary substances such as emulsifying, preserving, wetting agents and the like, as for example, sorbitan monolaurate, triethanolamine oleate, polyoxyethylene sorbitan monopalmityl, dioctyl sodium sulfosuccinate, and the like.

Exemplary of a typical method for preparing a tablet containing the active ingredient is to first suitably comminute the active ingredient with a diluent such as starch, sucrose, kaolin or the like to form a powder mixture. Next, the just prepared mixture can be granulated by wetting with a non-toxic binder such as a solution of gelatin, acacia mucilage, corn syrup and the like and after mixing the composition is screened to any predetermined particle sieve size. As an alternative, if preferred to granulation, the just prepared mixture can be slugged through conventional tablet machines and the slugs comminuted before the fabrication of the tablets. The freshly prepared tablets can be coated or they can be left uncoated. Representative of suitable coatings are the non-toxic coatings including shellac, methylcellulose, carnauba wax, styrenemaleic acid copolymers and the like. For oral administration, compressed tablets containing 0.01 milligram, 5 milligrams, 25 milligrams, 50 milligrams, etc., up to 1,500 milligrams, and the like, are manufactured in the light of the above disclosure and by art known fabrication techniques well known to the art and set forth in *Remington's Pharmaceutical Science*, Chapter 39, Mack Publishing Co., 1965. The pharmaceutical manufacture of a formulation is shown in Example 21:

EXAMPLE 21

|  | Per tablet, mg |
|---|---|
| Prostaglandin ether | 2.0 |
| Corn starch | 15.0 |
| Corn starch paste | 4.5 |
| Lactose | 82.0 |
| Calcium stearate | 2.0 |
| Dicalcium phosphate | 50.0 |

To formulate the tablet, uniformly blend the prostaglandin ether, corn starch, lactose and dicalcium phosphate in a V-blender until all the ingredients are uniformly mixed together. Next, the corn starch is prepared as a 10 percent aqueous paste and it is blended with the uniform mixture until a uniform mixture is obtained. Then, the wet granulation is passed through a standard eight mesh screen, dried and rescreened with a 12 mesh screen. The dry granules are next blended with calcium stearate and compressed into tablets. Other tablets containing 0.05, 0.25, 1.0, 5.0, 10.0 mgs, etc. are prepared in a like fashion.

The manufacture of capsules containing 0.1 milligram to 500 milligrams for oral use consists essentially of mixing the active compound with a non-toxic carrier and enclosing the mixture in a gelatin sheath. The capsules can be in the art known soft form of a capsule made by enclosing the compound in intimate dispersion within an edible oil or the capsule can be a hard capsule consisting essentially of the novel compound mixed with a non-toxic solid such as talc, calcium stearate, calcium carbonate or the like. Exemplary of a typical use employing capsules containing 25 mg of $11\alpha,15(S)$-bis(4'-methoxytetrahydropyran-4'-yloxy)-9-oxo-13-trans-prostenoic acid is therapeutically indicated ad libitum for inhibiting gastric secretions with lesser amounts indicated as the pH of the stomach of about 4 to 5.

The daily dose administered for the compounds will of course vary with the particular novel prostaglandin ether employed because of the varying potency of the compounds, the chosen route of administration and the size of the recipient. The dosage administered is not subject to definite bounds, but it will usually be an effective amount or the equivalent on a molar basis, of the pharmacologically active free acid form produced upon the metabolic release of the prostaglandin to achieve the biological function of the prostaglandin. Representative of a typical method for administering the 4'-lower alkoxytetrahydropyran prostaglandin ethers of the invention is by the injectable-type administration route. By this route, a sterile solution containing the compound is administered intravenously or subcutaneously at the rate of 0.01 microgram to 0.50 microgram per kilogram of body weight per minute by means of an infusion pump at the rate of 10 to 15 milliliters per hour. For example, the compound $9\alpha,11\alpha,15$(S)-tris-(4'-methoxytetrahydropyran-4'-yloxy)-13-trans-prostenoic acid can be administered by this route for producing stimulation of smooth muscles; $11\alpha,15(S)$-bis(4'-ethoxytetrahydropyran-4'-yloxy)-9-oxo-13-trans-prostenoic acid can be administered by this route for regulating the acidic gastric concentration and the volume of gastric secretion. Another typical method for administering the prostaglandin ether is by the oral route. By the oral route, 10 μg to 75 μg per kg of recipient per day is administered to evoke the desired effects. Thus, for a typical 75 kg recipient the daily dose is about 750 μg to 4125 μg. The compound is administered by the injectable route in a form suited for injection, such as mixed with sterile physiological saline, or in aqueous solutions having incorporated therein an agent that delays absorption such as aluminum monostearate and the like.

Suitable topical preparations containing the novel prostaglandin ethers can easily be prepared by, for example, mixing 500 mg of the 4'-lower alkoxytetrahydropyran-4'-yloxy prostaglandin with 15 g of cetyl alcohol, 1 g of sodium lauryl sulfate, 40 g of liquid silicone D.C. 200 sold by Dow Corning Co., Midland, Michigan, 43 g of sterile water, 0.25 g of methylparaben and 0.15 g of propylparaben and warming the mixture with constant stirring to about 75° C and then permitting the preparation to congeal. The preparation containing the prostaglandin ether can be readily applied to the skin by inunction or it can be applied topically by dispensing the preparation from a conventional surgical gauze dispenser, and the like. The prostaglandin ethers penetrate the outermost layer of the skin, the stratum corneum, more readily than unetherified prostaglandins and as such the prostaglandins' ethers lend themselves to topical administration. Suitable procedures for preparing topical applications are set forth in *Remington's Pharmaceutical Science*, Chapter 37, as cited supra.

The compounds of this invention can also be conveniently administered in aerosol dosage form. An aerosol form can be described as a self-contained sprayable product in which the propellant force is supplied by a liquified gas. For administering a self-propelled dosage form of about 100 mg to 500 mg that is used about 3 or 4 times daily for inhalation therapy, the bronchodialator $11\alpha,15(S)$-bis(4'-isopropoxytetrahydropyran-4'-yloxy)-9-oxo-5-cis,13-trans prostadienoic acid is suspended in an inert non-toxic propellant in a commercially available compressed-gas aerosol container. Suitable propellants include trichloromonofluoromethrane, dichlorodifluoromethane, dichlorodifluoroethane, monochlorodifluoroethane and mixtures thereof. The inert gas can also be mixed with non-toxic cosolvents such as ethanol, if desired, to produce the aerosol form. If the compound is administered by oral inhalation employing conventional nebulizers, it is convenient to dilute in an aqueous solution about 1 part of the novel prostaglandin with about 1,000 to 10,000 parts of solution, for administering 3 or 4 times per day.

For administering to valuable domestic household, sport or farm animals such as sheep, goats, cattle, etc., or for administering to laboratory animals for scientific studies, the compound is prepared in the form a food premix, such as mixing with dried fish meal, oatmeal, straw, hay, ground corn, mash, and the like, and then the prepared premix is added to the regular feed, thereby administering the compound to the domestic or laboratory animal in the form of feed.

In laboratory studies for determining the applicability of the prostaglandin ethers to mammals, including humans, avians, and valuable animals, the studies are carried out with rats, mice, etc. For example, in laboratory gastric anti-secretory studies with standard white laboratory rats, the compound 9α,11α,15(S)-tris(4'-methoxytetrahydropyran-4'-yloxy)-13-trans-prostenoic acid is administered orally by perfusion in saline at the rate of 0.1 microgram to 1.0 microgram per minute across the mucosal surface of the stomach to essentially inhibit release of titratable acidity.

The above examples and disclosure are set forth merely for illustrating the mode and the manner of the invention and various modifications and embodiments can be made by those skilled in the art in the light of the invention without departing from the spirit of the invention.

We claim:

1. Novel compound of the formula

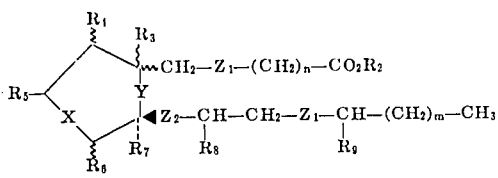

wherein $R_2$ is selected from the group consisting of hydrogen and a lower alkyl of one to eight carbon atoms inclusive; $R_3$ and $R_7$ are both hydrogen when y is a single bond and $R_3$ and $R_7$ are both absent when y is a double bond; $R_4$ is selected from the group consisting of keto,

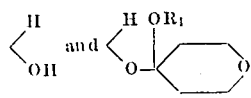

$R_5$ is selected from the group consisting of hydrogen and

$R_6$ is selected from the group consisting of hydrogen,

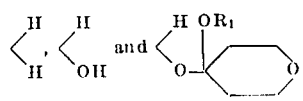

; $R_8$ is

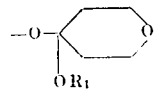

$R_9$ is selected from the group consisting of hydrogen and

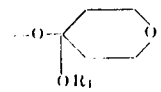

$R_1$ is a lower alkyl group one to eight carbon atoms inclusive; $Z_1$ is a member selected from the group of cis —CH=CH—, trans —CH=CH— and —CH$_2$CH$_2$—; $Z_2$ is selected from the group consisting of trans —CH=CH— and —CH$_2$CH$_2$—; x is selected from the group consisting of a single bond and a double bond; y is selected from the group consisting of a single bond and a double bond; and wherein n is 1 to 5, m is 0 to 5, the diastereomers and non-toxic salts thereof.

2. A compound according to claim 1 wherein the compound is 11α,15(S)-bis(4'-lower alkoxytetrahydropyran-4'-yloxy)-9-oxo-13-trans-prostenoic acid.

3. A compound according to claim 1 wherein the compound is 11α,15(S)-bis-(4'-lower alkoxytetrahydropyran-4'-yloxy)-9-oxo-5-cis,13-trans-prostadienoic acid.

4. A compound according to claim 1 wherein the compound is 11α,15(S)-bis-(4'-lower alkoxytetrahydropyran-4'-yloxy)-9-oxo-5-cis,13-trans,17-cis-prostatrienoic acid.

5. A compound according to claim 1 wherein the compound is 11α,15(S)-bis-(4'-lower alkoxytetrahydropyran-4'-yloxy)-9-oxo-13-trans-8-iso-prostenoic acid.

6. A compound according to claim 1 wherein the compound is 11α,15(S)-bis(4'-lower alkoxytetrahydropyran-4'-yloxy)-9-oxo-13-trans-ω-homo-prostenoic acid.

7. A compound according to claim 1 wherein the compound is 15(S)-(4'-lower alkoxytetrahydropyran-4'-yloxy)-9-oxo-10,13-trans-prostadienoic acid.

8. A compound according to claim 1 wherein the compound is 15(S)-(4'-lower alkoxytetrahydropyran-4'-yloxy)-9-oxo-5-cis,10,13-trans-prostatrienoic acid.

9. A compound according to claim 1 wherein the compound is 9α,11α,15(S)-tris-(4'-lower alkoxytetrahydropyran-4'-yloxy)-13-trans-prostenoic acid.

10. A compound according to claim 1 wherein the compound is 9α,11α,15(S)-tris-(4'-lower alkoxytetrahydropyran-4'-yloxy)-5-cis,13-trans-prostadienoic acid.

11. A compound according to claim 1 wherein the compound is 9α,11α,15(S)-tris-(4'-lower alkoxytetrahydropyran-4'-yloxy)-5-cis,13-trans,17-cis-prostatrienoic acid.

12. A compound according to claim 1 wherein the compound is 15(S)-19-bis-(4'-lower alkoxytetrahydropyran-4'-yloxy)-9-oxo-10,13-trans-prostadienoic acid.

13. A compound according to claim 1 wherein the compound is 11α,15(S)-bis-(4'-lower alkoxytetrahydropyran-4'-yloxy)-9-oxo-prostanoic acid.

14. A compound according to claim 1 wherein the prostaglandin ether is 11α,15(R)-bis-(4'-lower alkoxytetrahydropyran-4'-yloxy)-9-oxo-13-trans-prostanoic acid.

15. A compound according to claim 1 wherein the prostaglandin either is enantio 11α,15(R)-bis-(4'lower alkoxytetrahydropyran-4'-yloxy)-9-oxo-13-trans-prostanoic acid.

16. A compound according to claim 1 wherein the prostaglandin ether is 11β,15(R)-bis-(4'-lower alkoxytetrahydropyran-4'-yloxy)-9-oxo-13-trans-prostenoic acid.

17. A compound according to claim 1 wherein the prostaglandin ether is enantio 11β,15(R)-bis-(4'-lower alkoxytetrahydropyran-4'9-oxo-13-trans-prostenoic acid.

18. A compound according to claim 1 wherein the prostaglandin ether is racemic 11β,15(R)-bis-(4'-lower alkoxytetrahydropyran-4'-yloxy)-9-oxo-13-trans-prostenoic acid.

19. A compound according to claim 1 wherein the prostaglandin ether is 11α,15(S)-bis-(4'-lower alkoxytetrahydropyran-4'-yloxy)-9α-hydroxy-13-trans-prostenoic acid.

20. A compound according to claim 1 wherein the prostaglandin either is 11α,15(S)-bis-(4'-lower alkoxytetrahydropyran-4'-yloxy)-9β-hydroxy-13-trans-prostenoic acid.

21. A compound according to claim 1 wherein the prostaglandin ether is racemic 11β,15(R)-bis-(4'-lower alkoxytetrahydropyran-4'-yloxy)-9α-hydroxy-13-trans-prostenoic acid.

22. A compound according to claim 1 wherein the compound is enantio 15(S)-(4'-lower alkoxytetrahydropyran-4'-yloxy)-9-oxo-10,13-trans-prostadienoic acid.

23. A compound according to claim 1 wherein the compound is enantio 15(R)-(4'-lower alkoxytetrahydropyran-4'-yloxy)-9-oxo-10,13-trans-prostadienoic acid.

24. A compound according to claim 1 wherein the compound is 15(R)-(4'-lower alkoxytetrahydropyran-4'-yloxy)-9-oxo-10,13-trans-prostadienoic acid.

25. A compound according to claim 1 wherein the compound is 15(R)-(4'-lower alkoxytetrahydropyran-4'-yloxy)-9-oxo-5-cis, 10,13-trans-prostatrienoic acid.

26. A compound according to claim 1 wherein the compound is enantio 15(R)-(4'-lower alkoxytetrahydropyran-4'-yloxy)-9-oxo-5-cis,10,13-trans-prostatrienoic acid.

27. A compound according to claim 1 wherein the compound is enantio 15(S)-(4'-lower alkoxytetrahydropyran-4'-yloxy)-9-oxo-5-cis,10,13-trans-prostatrienoic acid.

* * * * *

UNITED STATES PATENT OFFICE
CERTIFICATE OF CORRECTION

Patent No. 3,723,423          Dated March 27, 1973

Inventor(s) Niels H. Andersen and Ned M. Weinshenker

It is certified that error appears in the above-identified patent and that said Letters Patent are hereby corrected as shown below:

Column 2, line 22, "-CH=CH-CO" should read -- -CH=CH- --; Column 4, line 38, "-CH=CH-CO" should read -- -CH=CH- --; Column 7, line 50, "$PGF_2$" should read --$PGF_{2\alpha}$--; Column 8, line 22, "$PGF_2$" should read --$PGF_{2\alpha}$--; Column 9, line 10, "solution" should read --sodium--; Column 12, line 61, "ytetrahydroyran" should read --ytetrahydropyran--; Column 12, line 63, "bix" should read --bis--; Column 12, line 65, "$PGF_{1\alpha}$" should read --$PGE_2$--; Column 12, line 67, "bix" should read --bis-- in both places; Column 12, line 67, "$PGF_1$" should read --$PGF_{1\alpha}$--; Column 13, line 7, "$Br^-(\phi=\phi_3P-CH_2$" should read --$Br^-(\phi=$phenyl) is used in place of $\phi_3P^+CH_2$--; Column 13, line 36, "$\phi_3P^+_2(CH_2)_3$ etc." should read --$\phi_3P^+CH_2)_3$ etc.--; Column 15, line 58, "fro" should read --for--; Column 21, line 9, "either" should read --ether--; Column 21, line 18, "alkoxytetrahydropyran-4'9-oxo-13-trans-" should read --alkoxytetrahydropyran-4'-yloxy)-9-oxo-13-trans- --.

Signed and sealed this 9th day of July 1974.

(SEAL)
Attest:

McCOY M. GIBSON, JR.
Attesting Officer

C. MARSHALL DANN
Commissioner of Patents